United States Patent [19]

Strauss

[11] Patent Number: 5,129,615
[45] Date of Patent: Jul. 14, 1992

[54] UMBRELLA HOLDER FOR A VEHICLE

[76] Inventor: Beatrice E. Strauss, 6334 Babcock Ave., North Hollywood, Calif. 91606

[21] Appl. No.: 699,704

[22] Filed: May 14, 1991

[51] Int. Cl.$^5$ .............................................. A47K 1/08
[52] U.S. Cl. .................................. 248/311.2; 206/564
[58] Field of Search ................ 248/309.1, 311.2, 314, 248/231.4, 312.1, 682; 135/48; 206/563, 564; 220/94 R

[56] References Cited

U.S. PATENT DOCUMENTS

| | | | |
|---|---|---|---|
| 2,535,563 | 12/1950 | Boyer | 248/231.4 |
| 2,620,082 | 12/1952 | Harmon | 248/231.4 |
| 2,867,401 | 1/1959 | Sheahan | 248/231.4 |
| 3,008,679 | 11/1961 | Powell | 248/231.4 |
| 4,088,081 | 5/1978 | D'Arca | 248/231.4 |

*Primary Examiner*—Ramon O. Ramirez
*Attorney, Agent, or Firm*—Jack C. Munro

[57] ABSTRACT

An umbrella holder providing for a location for depositing of an umbrella within the interior of a vehicle during the time when it is not being utilized. The umbrella holder comprises a tray which has an open top providing access into a compartment. The umbrella, in a collapsed state, is to be deposited within the compartment. The tray may include a pair of bracket arms which are to be used to engage with specific structure located within the vehicle.

5 Claims, 2 Drawing Sheets

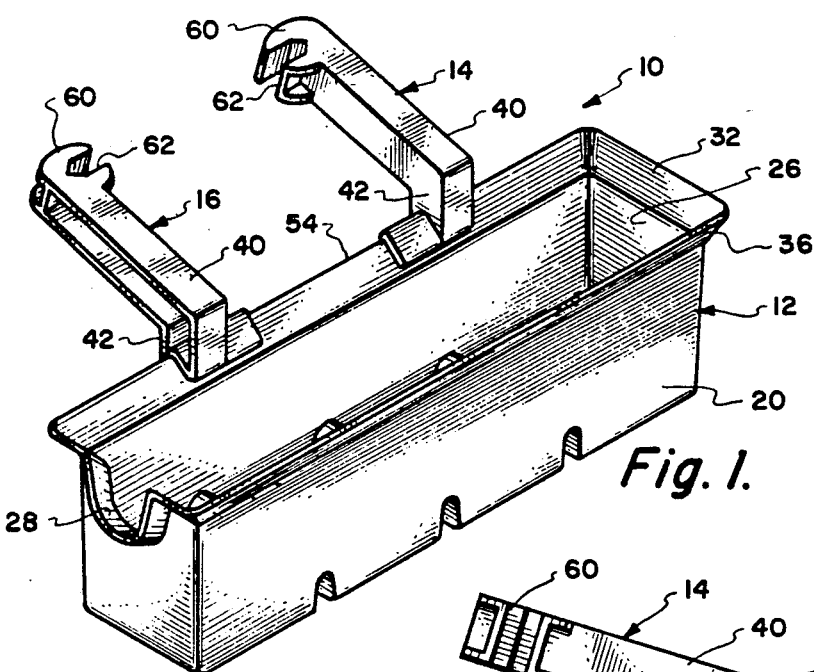
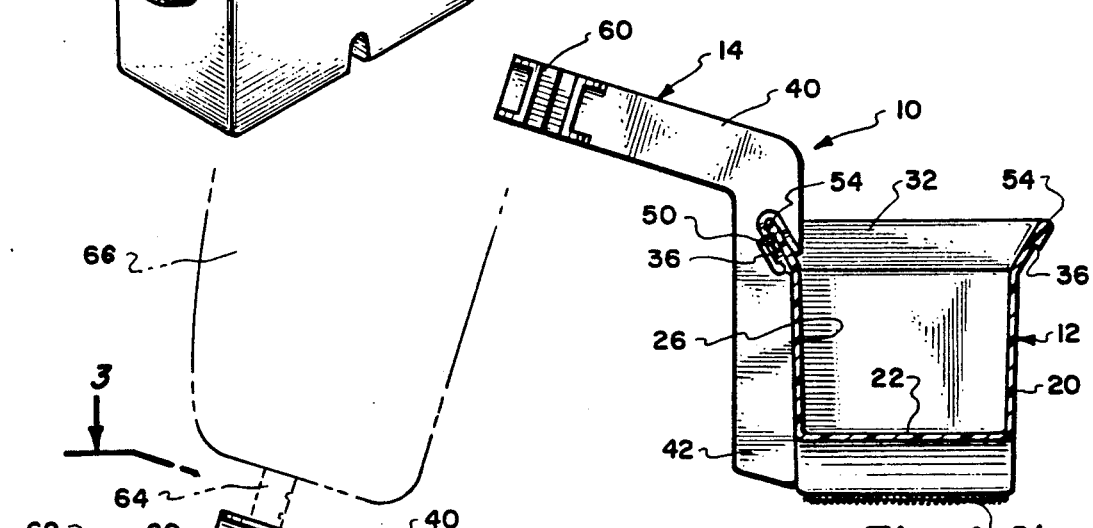
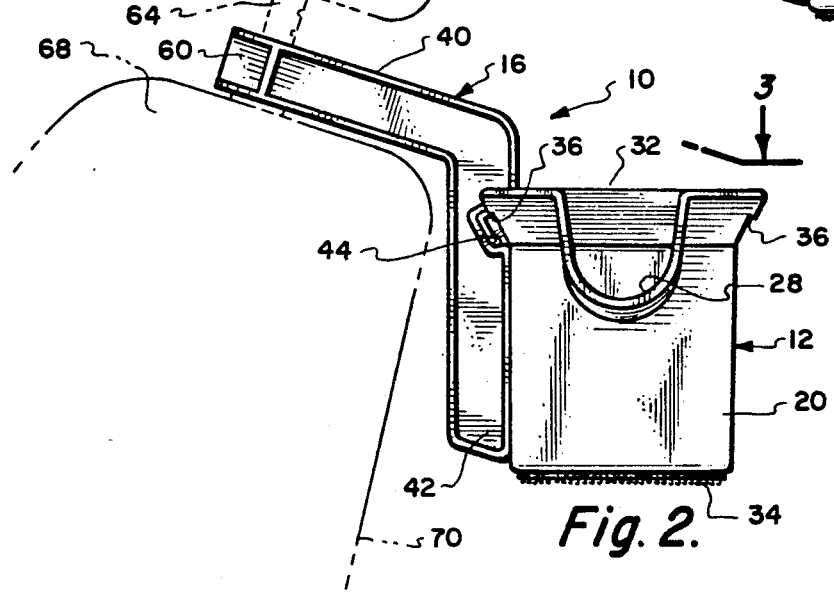

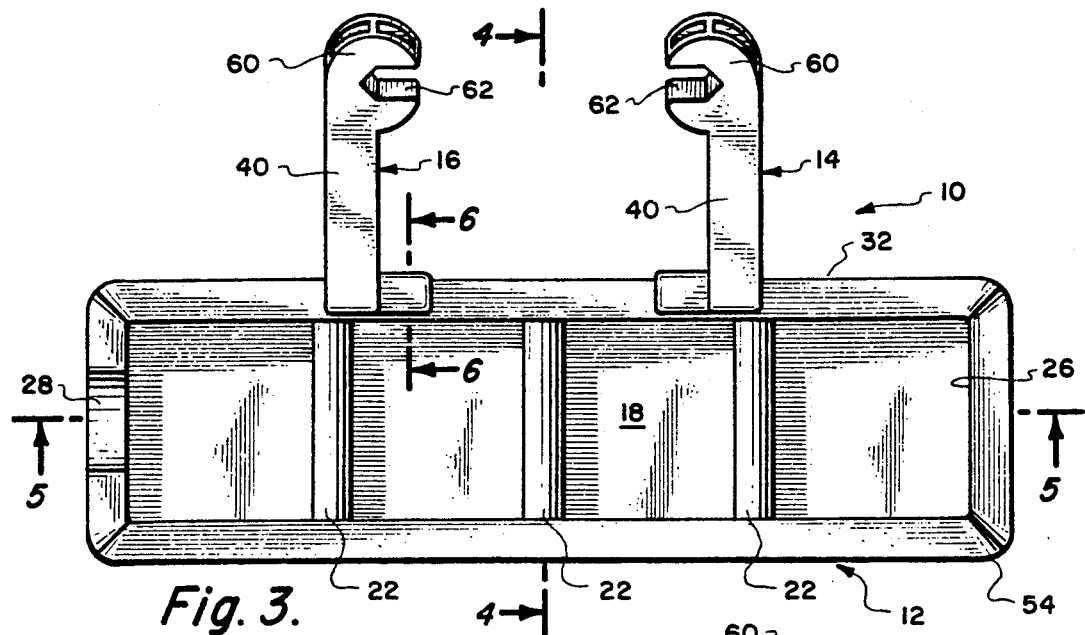
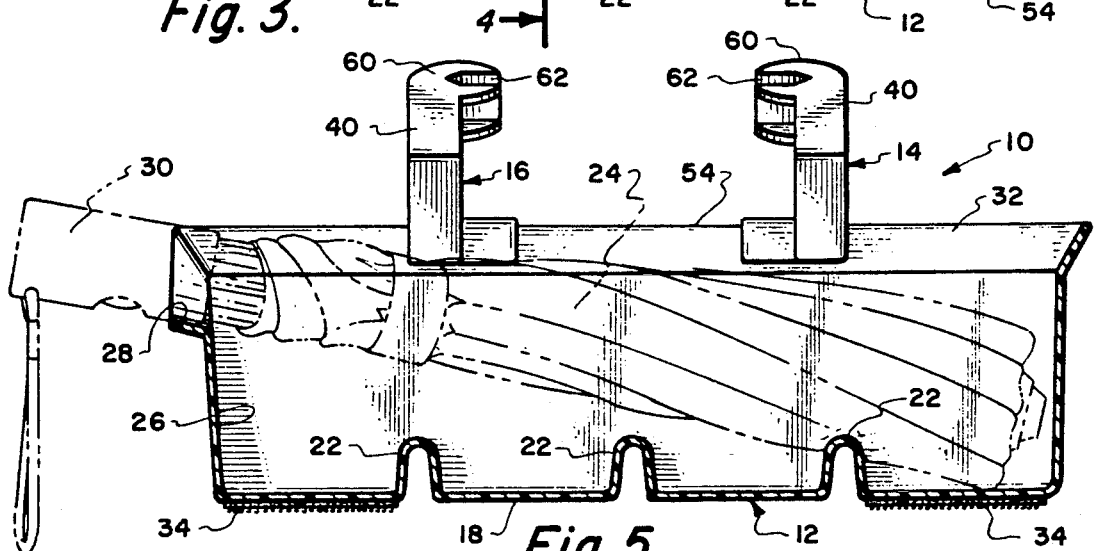
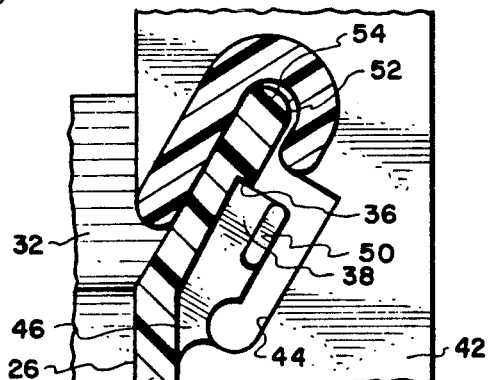
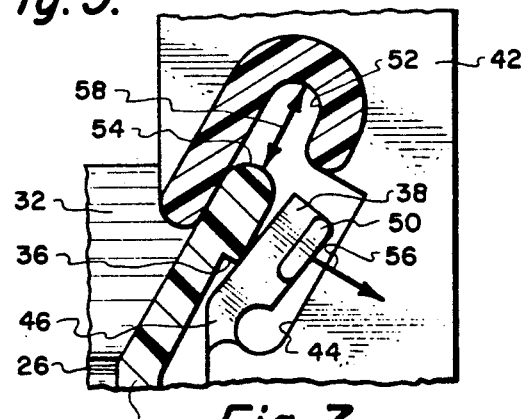

UMBRELLA HOLDER FOR A VEHICLE

BACKGROUND OF THE INVENTION

1) Field of the Invention

The field of this invention relates to article holders and more particularly to a holder for an umbrella to be utilized within a vehicle to support the umbrella when the umbrella is not being utilized.

2) Description of the Prior Art

Holders for mounting various types of articles within the interior of a vehicle, such as an automobile or truck, are well-known. There have been designed holders for mounting waste containers, garage door openers, eyeglass cases, ice scrapers, as well as numerous other products at various locations within the interior of the vehicle. Such holders are typically in the form of clips for mounting the article on a certain interior structure of the vehicle, such as the sun visor, door, floor, etc.

It is generally well-known to most individuals that an umbrella is an inconvenience when placed within an automobile or other similar vehicle. The umbrella is utilized in an expanded state as the individual is entering the vehicle. The umbrella is then quickly collapsed and is then placed within the interior of the vehicle, generally on the floor. The umbrella is dripping wet which means that the dripping water comes into contact with various areas of the passenger compartment of the vehicle. What normally occurs is the floor, as well as certain portions of the upholstery, may become soaked. This of course is objectionable.

In the past, there have been numerous attempts of designing umbrella holders for the interior of vehicles. Such umbrella holders generally require specialized connectors such as screws and bolts which requires specialized installation techniques to install the umbrella holder at a particular desired location within the passenger compartment of the vehicle. This specific installation takes a certain amount of time as well as requiring certain tools and a special skill which is not available to everyone. Also, the idea of drilling holes through the wall surface of the interior compartment of the vehicle is not a desirable practice for a great many individuals, especially individuals that have a significant amount of "pride of ownership" in respect to their vehicle.

SUMMARY OF THE INVENTION

The present invention is directed to an umbrella holder in the form of a tray which is designed to facilitate the entry and location of a collapsed umbrella so that the umbrella can drain within the tray and the drained water will be collected by and remain within that tray. The bottom surface of the tray is configured so that most of the body of the umbrella is located at a spaced elevation above the bottommost surface of the tray so that the umbrella will not rest within the collected water within the tray. The handle portion of the umbrella is to rest within a recess formed within a sidewall of the tray. The tray is to be connectable to a pair of mounting brackets which is to engage with a particular type of structure within a vehicle to support the tray in a position elevated from the floorboard of the passenger compartment of the vehicle. The mounting brackets are to be removably connected to the tray and the mounting brackets are also adjustable relative to the tray so as to accommodate the tray to different installation requirements so that the umbrella holder of this invention can be utilized within a wide number of different vehicles.

One of the primary objectives of the present invention is to construct an umbrella holder which facilitates the location and placement of an umbrella within a vehicle during the time it is not being used and provides a collecting container for water as the umbrella drains.

Another objective of the present invention is to provide an umbrella holder for a vehicle which can be utilized within a wide variety of different types of vehicles not requiring any special installation procedures such as an invasive type of installation (screws and bolt types of fasteners).

Another objective of the present invention is to provide an umbrella holder which can be utilized to store other types of articles other than umbrellas if such is deemed to be desired.

Another objective of the present invention is to provide an umbrella holder which can be installed at different locations within the vehicle according to individual desires.

BRIEF DESCRIPTION OF THE DRAWINGS

FIG. 1 is an isometric view of the umbrella holder of the present invention showing the combination of the tray and the mounting bracket arms being mounted thereon;

FIG. 2 is a side view of the umbrella holder of the present invention depicting the mounting of the umbrella holder in conjunction with the headrest assembly utilized in conjunction with a vehicular seat;

FIG. 3 is a top plan view of the umbrella holder of the present invention taken along line 3—3 of FIG. 2;

FIG. 4 is a transverse cross-sectional view through the umbrella holder of the present invention taken along line 4—4 of FIG. 3;

FIG. 5 is a longitudinal cross-sectional view taken along line 5—5 of FIG. 3 showing a collapsed umbrella placed within the umbrella holder of the present invention;

FIG. 6 is a cross-sectional view through the attachment arrangement utilized to connect one of the mounting arms in conjunction with the tray showing the position of the attachment when the arm is connected to the tray; and FIG. 7 is a view similar to FIG. 6 but showing the mounting arm in a partially installed position.

DETAILED DESCRIPTION OF THE SHOWN EMBODIMENT

Referring particularly to the drawings, there is shown the umbrella holder 10 of this invention which is composed primarily of a tray 12 and arm members 14 and 16.

The tray 12 is basically of a box-like configuration and formed of sheet material such as plastic or metal. The tray 12 has a bottom 18 which is basically rectangular in configuration. Integrally connected at the peripheral edge of the bottom 18 is an upstanding, enclosing sidewall 20. The sidewall 20 is also formed of sheet material similar to the bottom 18. The bottom 18 includes a plurality of spaced apart upstanding ridges 22. These ridges 22 are integral with the bottom 18. It is the function of the ridges 22 to provide a resting area for the outer end of the umbrella 24 which locates the umbrella 24 in a mostly spaced position above the planar portion of the bottom 18. Water is drained from the umbrella 24 and collected against the bottom 18 in the area between the ridges 22.

The sidewall 20 enclosed a compartment 26 within which is located the umbrella 24. Within one end of the sidewall 20 is located a recess 28. The handle section 30 of the umbrella 24 is to be located within the recess 26 to provide a resting area therefor.

The uppermost free edge of the sidewall 20 is defined into an outwardly extending flange 32. The function of the flange 32 is to help guide the umbrella 24 through the open top of the tray 12 into the compartment 26. Also, it is the function of the flange 32 to cause any drippings of water to pass into the compartment 26 that will fall free of the umbrella 24 when it nears the tray 12.

It is considered to be within the scope of this invention that the tray 12 could be placed on a supportive surface such as a floorboard of a vehicle. To prevent the tray 12 from sliding around on the floorboard, the exterior portion of the bottom 18 is to have a pad 34 secured thereto. The pad 34 is to include a mass of closely spaced tiny hook members which are to function as a grabbing surface when placed on a carpet or other similar type of material that is commonly used on floorboards of vehicles. Such a pad 34 is deemed to be conventional and is in common use in conjunction with a product sold under the tradename of Velcro.

The longest straight sections of the flange 32 have formed on the exterior surface thereof a shoulder 36. The function of the shoulder 36 is to engage with lever 38 of either bracket arm 14 or 16. The basic construction of the bracket arms 14 and 16 is identical except for bracket arm 14 being a mirror image of bracket arm 16. For purposes of this invention, the parts that are similar between bracket arms 14 and 16 will be assigned the same number in the drawings with it being understood that both arms 14 and 16 will include the same part.

Both bracket arms 14 and 16 include an upper section 40 and a lower section 42. Both arms 14 and 16 will be constructed out of a plastic material. The lever 38 is integrally formed as part of the lower section 42 with an L-shaped slot 44 being formed within the lower section 42 forming in essence the lever 38. The lever 38 is connected by a bridge 46 of material to the main portion of the lower section 42. The lever 38 is capable of flexing or pivoting about the bridge 46 from the position shown in FIG. 6 to the position shown in FIG. 7. This flexing or pivoting is to occur manually by the application of a manual pressure against protuberance 50. The lower section 42 includes an open ended groove 52. The size of the groove 52 is such that it closely conforms to the rim 54 of the flange 32 with the rim 54 to be locatable within the groove 52. When the rim 54 is so located, the lever 38 is to connect with the shoulder 36 as is clearly shown in FIG. 6 of the drawings. In this particular position, each of the bracket arms 14 and 16 are now tightly retained in position in conjunction with the tray 12 with the exception that the arms 14 and 16 can be moved toward and away from each. In other words, the arms 14 and 16 are capable of sliding movement on the flange 32.

If it is desired to disengage the arms 14 and 16 from the flange 32, the user only needs to manually press against the handle 50 to cause the lever 38 to disengage from the shoulder 36. This will permit the arms 14 and 16 to disconnect from the tray 12 with a partial disconnection being shown in FIG. 7. The manual application of force against the handle 50 is depicted by arrow 56.

The separation between the lower section 42 and the rim 54 is depicted by arrow 58. It is to be understood that once the bracket 14 or 16 has been completely separated from the rim 54, that the lever 38 will automatically pivot back to the position shown in FIG. 6. When the groove 52 is pressed to engage with the rim 54 to connect either arm 14 or 16 to the flange 32, the lever 38 will automatically deflect until it can engage with shoulder 36. In other words, during the engagement process, no manual movement of the handle 50 required.

The outer end of the upper section 40 of each arm member 14 and 16 includes an enlarged head 60 within which is formed a recess 62. One recess 62 is to engage with a pin 64 which supportingly interconnects a headrest 66 to a vehicle seat 68. It is to be understood that there will be two such pins 64 with each recess 62 to connect with a pin 64. It is to be understood that within some vehicles the spacing between the pins 64 can vary. Therefore, sliding adjusting movement between the arm members 14 and 16 is permitted on the flange 32 in order to achieve the desired locating of a pin 64 within a recess 62.

When a pin 64 is connected within each recess 62, the tray 12 is mounted against the upper back surface 70 of the vehicle seat 68. This is a convenient location for the tray 12 to place the umbrella 24 within the compartment 26 when a human enters the vehicle (not shown). Also, this location of the tray 12 facilitates the removal of the umbrella 24 when the user leaves the vehicle.

It is considered to be within the scope of this invention that the recesses 62 could connect with other structural members other than the pins 64 of a headrest 66.

What is claimed is:

1. An umbrella holder for a vehicle comprising:
a tray having a closed bottom with a peripheral edge, an enclosing sidewall attached to said peripheral edge, said enclosing sidewall and said closed bottom defining a compartment, said enclosing sidewall having a free upper edge forming an open top of said tray providing for access into and out of said compartment, said upper edge being outwardly flared defining a flange; and
a pair of arm members mounted on said flange in a mirror image relationship, said arm members being spaced apart, each said arm member being individually lineally movable on said flange, each said arm member having an arm member retention mechanism locking each said arm member onto said tray but yet permitting free movement of said arm members toward and away from each other, said arm member retention mechanism being separate and identical for each said arm member.

2. The umbrella holder as defined in claim 1 wherein: said tray being rectangular producing a substantially box-like configuration.

3. The umbrella holder as defined in claim 1 wherein: said closed bottom having a plurality of spaced apart ridges, said ridges being located within said compartment, said ridges being of a height substantially less than the height of said enclosing sidewall, whereby an umbrella is adapted to lay against one or more of said ridges thereby positioning the umbrella a short distance from the portion of said closed bottom located between said ridges.

4. The umbrella holder as defined in claim 1 wherein:

said enclosing sidewall including a recess, said recess providing a resting location for a portion of the body of an umbrella.

5. The umbrella holder as defined in claim 1 wherein: each said arm member retention mechanism being spring biased to a locking position, each said arm member retention mechanism being manually movable from said locking position to an unlocking position.

* * * * *